March 8, 1960 A. F. ELLIOTT 2,927,620
PLASTIC LAMINATING MACHINE
Filed March 15, 1956 2 Sheets-Sheet 1
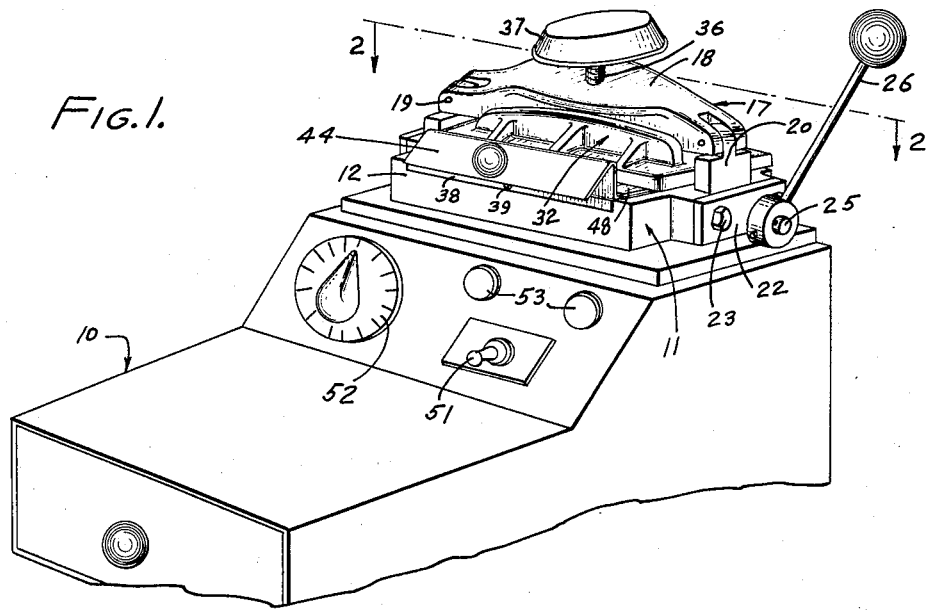
FIG. 1.
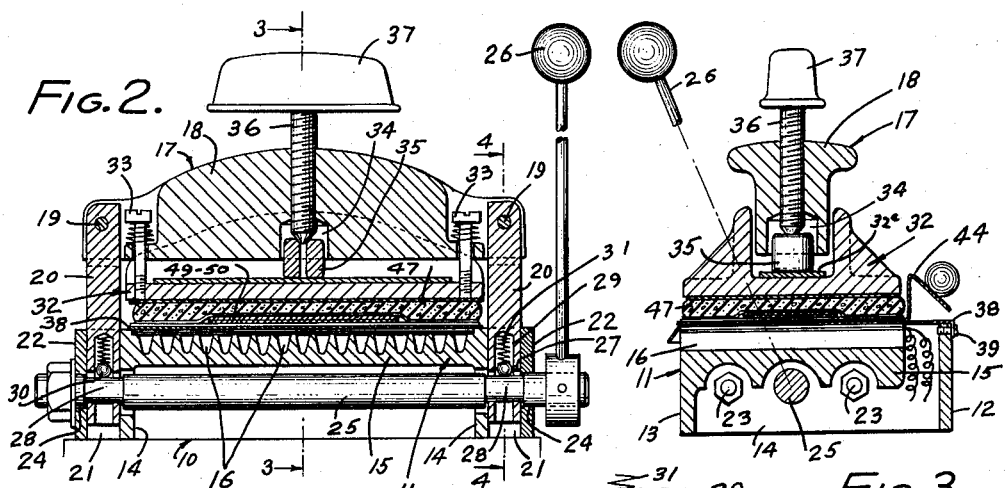
FIG. 2.
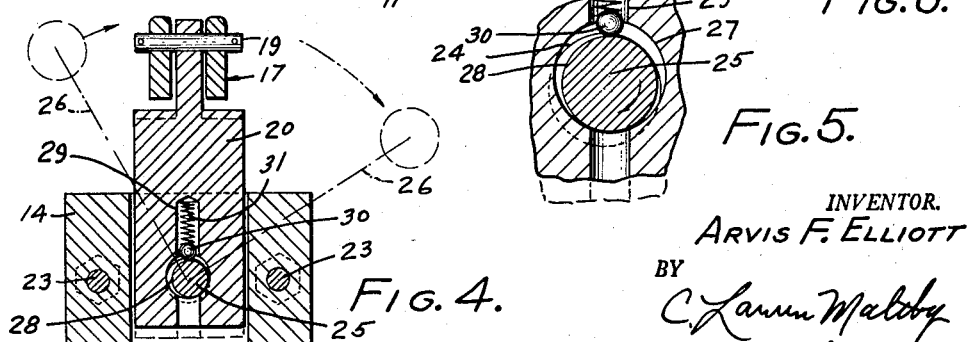
FIG. 3.
FIG. 4.
FIG. 5.
INVENTOR.
ARVIS F. ELLIOTT
BY
C. Larun Malby
ATTORNEY March 8, 1960  A. F. ELLIOTT  2,927,620
PLASTIC LAMINATING MACHINE
Filed March 15, 1956  2 Sheets-Sheet 2
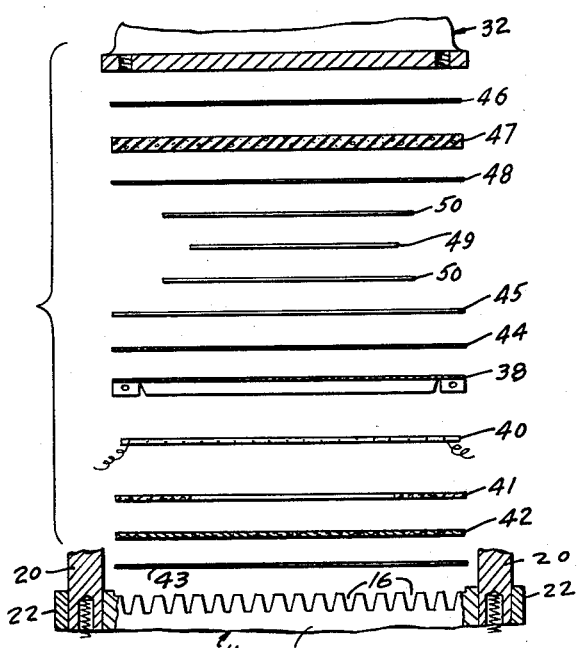
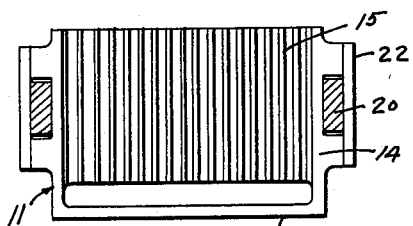
FIG. 7.
FIG. 8.
FIG. 9.
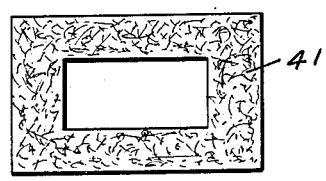
FIG. 10.
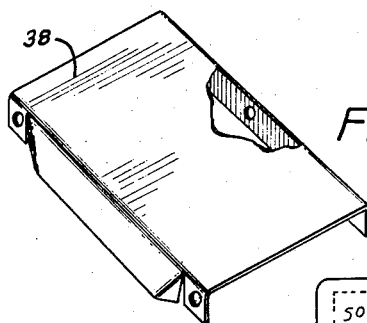
FIG. 12.
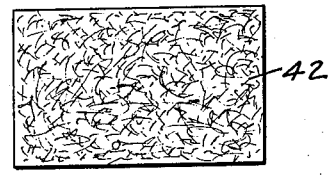
FIG. 11.
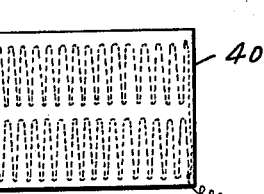
FIG. 14.
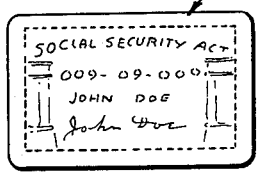
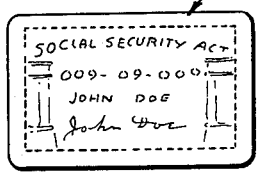
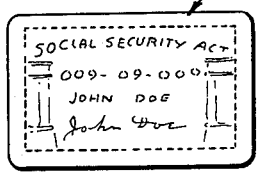
FIG. 13.
INVENTOR.
ARVIS F. ELLIOTT
BY
C. Lauren Maltby
ATTORNEY

United States Patent Office 2,927,620
Patented Mar. 8, 1960

2,927,620

PLASTIC LAMINATING MACHINE

Arvis F. Elliott, Norwalk, Calif.

Application March 15, 1956, Serial No. 571,774

1 Claim. (Cl. 154—1)

This invention relates to machines and making laminated articles using plastic materials.

In the art of plastic laminating a common procedure is the pressing together of the laminate sheets and the article pressed together with the application of heat, and in carrying out such processes it is important that temperatures and pressures be applied within fine limits. In machines heretofore developed, temperature controls have been adequately provided, however, this has not been true with respect to pressure. It is, therefore, the primary purpose and objective of this invention to provide an improved plastic laminating machine of simple and inexpensive construction wherein the application of heat and pressure in forming the laminates can be controlled within fine limits, although capable of variation when desired.

More specific objects and advantages will become apparent and be brought out more fully in the following specification, reference being had to the accompanying drawing, wherein:

Figure 1 is a perspective view, partly broken away, of an embodiment of the invention.

Figure 2 is a sectional view taken along the line 2—2 of Figure 1.

Figure 3 is a sectional view taken along the line 3—3 of Figure 2.

Figure 4 is a sectional view, enlarged, taken along the line 4—4 of Figure 2.

Figure 5 is an enlarged partial view of the shaft eccentric shown in Figure 4.

Figure 6 is an exploded view showing the elements of the machine, including the laminates used in the operation of the machine.

Figure 7 is a top view of the heating bed element.

Figure 8 is a top view of the steel plate that overlies the bed.

Figures 9 and 10 are top views of asbestos spacer plates shown in Figure 6.

Figure 11 is a view of one of the heating elements.

Figure 12 is a perspective view of the top vent plate.

Figure 13 is a perspective view of a tray element which may be used with the machine, and Figure 14 is a face view of a finished article after lamination.

Referring more particularly to the drawings, the machine of this invention comprises a cabinet 10 having an elevated rear portion on which is suitably secured a base frame or block 11, preferably of cast metal, having a front wall 12, rear wall 13 and end walls 14. The block 11 has a heater bed 15 extending forwardly from rear wall 13, the upper portion of the bed being formed with grooves 16 which form ventilation passages.

A yoke unit 17 is mounted on frame 11 and comprises a yoke clamping member 18 pivoted at 19 to a pair of legs 20 which are slidable in guide channels 21 formed in frame 11 at each end thereof. A bearing plate 22 covers each channel 21 and is secured to the frame block 11 as by bolts 23. Plates 22 have bearing bores 24 and provide mounting for a shaft 25 which is provided with a handle 26 for rotation thereof. Legs 20 are each formed with a bore hole 27 through which shaft 25 extends, and in these regions the shaft is formed with a pair of eccentrics 28. Legs 20 are each formed with a bore 29, in each of which is positioned a ball 30 and spring 31, the ball being pressed against eccentric 28, the spring pressure being such that legs 20 are urged upwardly and the lower portions of holes 27 being maintained in contact with the eccentric. By this construction, turning of handle 26 and rotation of shaft 25 approximately ninety degrees as indicated in Figure 4, will move the yoke clamp member 18 downwardly by the amount of the eccentricity of eccentric 28, as is clearly seen in Figure 5.

A pressure plate casting member 32 is articulately suspended below and from yoke clamp member 18 such as by bolts 33. Clamp member 18 has a central recess 34 in the lower face thereof, in which recess is positioned a bearing block 35 which is maintained in contact with a steel plate 32a on member 32 by an adjusting screw 36 which has a knob or handle 37, it being clear that block 35 is positioned substantially at the center of plates 32 and 32a and that when the yoke member is actuated by rotation of shaft 25, pressure will be transmitted to plate 32 substantially throughout the area thereof from block 35 and steel plate 32a to keep the casting from bending.

A flanged plate member 38 is secured on block 11 as by screws 39, and secures on the block 11 one or more heat elements 40, asbestos elements 41 and 42, and a steel plate 43, as shown in Figure 6. Asbestos element 41 is shown with a central cut-out portion to permit transfer of heat more equally into the lower casting, preventing a hot spot in the center of work. Figure 13 shows a tray element 44 and additional accessories or a lower polish plate 45, a top polish plate 46, a rubber pad 47, and a layer of foil 48. An element such as a card or photograph 49 to be laminated, is placed between a pair of sheets of plastic 50. Figure 1 shows a switch 51, a timer 52, and one or more signal or indicating lamps 53 suitably mounted on the cabinet and connected to an appropriate source of electrical current, together with heater elements 40.

In the operation of the machine rotation of shaft 25 by handle 26 will move the pressure plate 32 downwardly a precise amount as determined by the eccentricity of eccentrics 28, and the pressure applied on the "sandwich" consisting of the article 49 and the two plastic sheets 50, will be uniform after a trial run and adjustment of yoke screw 36. Any number of duplicate laminates may then be made with precisely the same pressure.

Having described my invention, what I claim is:

A plastic laminating machine comprising in combination a frame, a heated plate supported thereon, a top plate, a yoke extending over said plates, articulate means interconnecting said yoke and top plate, means mounting said articulate means on said frame permitting limited vertical movement, means for actuating said last means, and means for heating said heated plate, bearings mounted on said frame for said shaft, said shaft having a pair of eccentric portions and said articulate means being bearing mounted on said shaft eccentric portions, said articulate means including a bore extending radially from said shaft and a spring seated ball in said bore engaging said shaft, whereby said shaft eccentric portions are held in engagement with a portion of the frame bearings and said shaft may be shifted longitudinally for insertion in and removal from said bearings.

References Cited in the file of this patent

UNITED STATES PATENTS

| | | |
|---|---|---|
| 543,731 | Hempsted | July 30, 1895 |
| 2,395,387 | Fry et al. | Feb. 26, 1946 |
| 2,521,282 | Butler | Sept. 5, 1950 |
| 2,624,389 | Bungay | Jan. 6, 1953 |
| 2,653,647 | Swartz | Sept. 29, 1953 |